US012498004B2

(12) United States Patent
Jung

(10) Patent No.: US 12,498,004 B2
(45) Date of Patent: Dec. 16, 2025

(54) VARIABLE-SPEED POWER TRANSMISSION CLUTCH SYSTEM HAVING MULTIPLE OUTPUT STRUCTURE

(71) Applicant: TAE YOUNG FAN GUARD CO., LTD., Busan (KR)

(72) Inventor: Gil Yong Jung, Busan (KR)

(*) Notice: Subject to any disclaimer, the term of this patent is extended or adjusted under 35 U.S.C. 154(b) by 231 days.

(21) Appl. No.: 18/265,925

(22) PCT Filed: Dec. 16, 2021

(86) PCT No.: PCT/KR2021/019174
§ 371 (c)(1),
(2) Date: Jun. 7, 2023

(87) PCT Pub. No.: WO2022/139323
PCT Pub. Date: Jun. 30, 2022

(65) Prior Publication Data
US 2024/0026937 A1    Jan. 25, 2024

(30) Foreign Application Priority Data
Dec. 24, 2020 (KR) .................. 10-2020-0183629

(51) Int. Cl.
*F16D 27/01* (2006.01)
*F16D 27/14* (2006.01)

(52) U.S. Cl.
CPC .............. *F16D 27/01* (2013.01); *F16D 27/14* (2013.01)

(58) Field of Classification Search
None
See application file for complete search history.

(56) References Cited

U.S. PATENT DOCUMENTS 5,013,949 A * 5/1991 Mabe, Jr. ............ H02K 49/102
310/83
5,477,094 A * 12/1995 Lamb .................. H02K 49/046
310/105
(Continued)

FOREIGN PATENT DOCUMENTS

JP          6577754 B2   8/2019
KR  10-2004-0068688 A   8/2004
(Continued)

*Primary Examiner* — Bernard Rojas
(74) *Attorney, Agent, or Firm* — KORUS Patent, LLC; Seong Il Jeong

(57) ABSTRACT

The present invention relates to a variable-speed power transmission clutch system which enables a plurality of load shafts to be driven corresponding to one power shaft by an eddy current generated by magnetic force and a rotating magnetic field. To this end, the present invention provides a variable-speed power transmission clutch system having a multiple output structure and comprising: a plurality of load shafts B arranged on concentric circles; a plurality of second rotary units 20 for forming a cylindrical body part 21*a* at an end part of the load shafts B and forming a magnet 22 around the outer diameter circumference of the cylindrical body part 21*a*; a first rotary unit 10 installed to face the outer diameter surface of the plurality of second rotary units 20 and forming, on a facing surface opposite to the second rotary units 20, a magnetic force reinforcing plate 12 magnetically responding to the magnet 22; and a power shaft A coupled to the rotation center of the first rotary unit 10 to provide a rotational force thereto.

8 Claims, 12 Drawing Sheets

(56) References Cited

U.S. PATENT DOCUMENTS 5,712,519 A * 1/1998 Lamb ................... H02K 49/046
                                                              310/78
2017/0080136 A1     3/2017   Janeczek et al.

FOREIGN PATENT DOCUMENTS

| KR | 10-2005-0017885 A | 2/2005 |
| KR | 10-0632849 B1 | 10/2006 |
| KR | 10-1511164 B1 | 4/2015 |
| KR | 10-2019-0141306 A | 12/2019 |

\* cited by examiner

VARIABLE-SPEED POWER TRANSMISSION CLUTCH SYSTEM HAVING MULTIPLE OUTPUT STRUCTURE

TECHNICAL FIELD

The present invention relates to a variable-speed power transmission clutch system having multiple output structure, and more particularly, variable-speed power transmission clutch system having multiple output structure that can transmit power in a non-contact state by using the structure of a magnet to a magnetic force reinforcing plate.

BACKGROUND ART

The statement described in this section simply provides background information regarding one embodiment of the present invention and does not constitute prior art.

Generally, various types of devices exist in power transmission devices. Among them, the representative one is the means of transmitting physical force through mechanical contact and include power transmission using gears, transmission using pulleys and belts, and the like. Such paired power transmission devices are called couplers, couplings or the like.

This coupling is for transmitting driving forces, and connects two different axes, such as a power shaft that is connected to a motor, engine or the like to transmit driving force and a load shaft or driven shaft that is connected to a rotating object such as a pump, thus allowing the two shafts to rotate simultaneously.

As these couplings engage and rotate through the mechanical connection, frictional noise, dust, vibration, reduced energy efficiency, reduced durability, mechanical burnout, etc. may occur.

Further, when a rotating object with a high load is located on the load shaft or the same shaft during initial operation, the high load is applied equally to the power shaft. Thus, when a motor or an engine shortens its lifespan or performs sudden stops or sudden changes of rotation direction due to an abnormal situation, mechanical shocks are transmitted to the power shaft without buffering, and thus damage occurs frequently.

Therefore, as the coupling through mechanical connection prevents noise and vibration from occurring, or as the load shaft or the driven shaft stops rotating due to, for example, foreign substances being caught in the pump, a magnetic coupling using the magnetic force of a magnet is used so as to prevent overloading of the electric motor of the power shaft, etc.

Accordingly, various types of couplings have been proposed, the representative of which is Korean Unexamined Patent Publication No. 10-2005-0017885 entitled "Non-contact power transmission structure using magnetic force" published on Feb. 23, 2015 (hereinafter referred to as 'prior art'), which relates to a structure for transmitting power while connecting between a separated main shaft and a driven shaft. Specifically, as a pair of magnetic bodies consisting of a first magnet formed in the center and composed of either N pole or S pole, and a second magnet formed outside the first magnet and divided into a plurality of N poles and S poles is configured, a non-contact power transmission structure using magnetic force capable of transmitting the power of the main shaft to the driven shaft in a non-contact state using magnetic force is provided.

However, the prior art as described above has a structure that utilizes an attractive force and a repulsive force of the magnets arranged on the disk of the power shaft and the disk of the load shaft, which makes it difficult to transmit constant power due to periodic slip phenomenon. There is a drawback of having an integral structure to overcome the periodic slip phenomenon.

In addition, other general magnetic couplings generate magnetic and resistance heat due to eddy current when attractive force and repulsive forces occur, and the high heat generated in this way is the main cause of magnetic force reduction, which lowers energy efficiency. In the case of the existing general coupling, it was solved by installing and operating a valve for adjusting flow rate, but this process is a major cause of overload, causes mechanical damage, and reduces energy efficiency. That is, the conventional magnetic coupling does not efficiently transfer the power of the motor side to the driven shaft, so that the power transmission efficiency is slightly low, and the power transmission efficiency of the motor is low, which makes it difficult to precisely control the rotation of the driven shaft.

DETAILED DESCRIPTION OF THE INVENTION

Technical Problem

The present invention has been designed to solve the above problems, and an object thereof is to provide a variable-speed power transmission clutch system having multiple output structure that can transmit power while minimizing heat generated by slip or eddy current with the magnetic force formed between a rotary unit including a magnetic member operatively connected to either a power shaft or a load shaft, and a rotary unit of the magnetic member arranged on the load shaft or power shaft corresponding thereto.

Another object of the present invention is to provide a variable-speed power transmission clutch system having multiple output structure that enables the control of the load on a load shaft to which an object to rotate is coupled, thereby preventing damage to the power generating source such as the motor or engine of the power shaft.

However, technical tasks obtainable from the present invention are not limited to the above-mentioned technical tasks, and other technical tasks not mentioned herein can be clearly understood from the following description by those having ordinary skill in the art.

Technical Solution

In order to achieve the above object, according to one aspect of the present invention, there can be provided a variable-speed power transmission clutch system having multiple output structure, wherein the variable-speed power transmission clutch system enables a plurality of load shafts to be driven corresponding to one power shaft by an eddy current generated by magnetic force and a rotating magnetic field, and comprises: a plurality of load shafts B arranged on concentric circles; a plurality of second rotary units 20 for forming a cylindrical body part 21*a* at an end part of the load shafts B and forming a magnet 22 around the outer diameter circumference of the cylindrical body part 21*a*; a first rotary unit 10 that is installed so as to face the outer diameter surface of the plurality of second rotary units 20 and forms a magnetic force reinforcing plate 12 responding magnetically with a magnet 22 on a surface opposite to the second rotary unit 20; and a power shaft A coupled to the rotation center of the first rotary unit 10 to provide a rotational force thereto.

The axial direction of the power shaft A is arranged to be parallel to the axial direction of the load shaft B.

The axis center of the power shaft A is arranged to pass through the inner centers of the concentric circles of the plurality of load shafts B, the first rotary unit 10 installed at the end part of the power shaft A forms a cylindrical body part 11a and is installed to be located at the center of a concentric circle of a plurality of second rotary units 20, and a magnetic force reinforcing plate 12 is formed on the outer diameter surface of the cylindrical body part 11a to face the magnet 22 formed on the outer diameter surface of the second rotary unit 20.

The axis center of the power shaft A is arranged to pass through the inner centers of the concentric circles of the plurality of load shafts B, the first rotary unit 10 installed at the end part of the power shaft A forms a drum-shaped body part 11b and is installed to surround the outside of the concentric circles of the plurality of second rotary units 20, and a magnetic force reinforcing plate 12 is formed on the inner surface of the drum-shaped body part 11b to face the magnet 22 formed on the outer diameter surface of the second rotary unit 20.

The axial direction of the power shaft A is arranged to form a right angle with respect to the axial direction of the load shaft B.

A plurality of load shafts B are radially arranged with respect to the axis center of the power shaft A, the first rotary unit 10 installed at the end part of the power shaft A forms a disc-shaped body part 11c, and a magnetic force reinforcing plate 12 is formed on the disc-shaped body part 11c to face the magnet 22 formed on the outer diameter surface of the second rotary unit 20.

The variable-speed power transmission clutch system allows the positions of the first rotary unit 10 and the second rotary unit 20 so as to be spaced apart or close to each other so as to control the amount of load applied to the coupling.

The second rotary unit 20 comprises a second body part 21, a magnet 22 arranged and coupled around the opposite surface of the second body part 21 to the first rotary unit 10, a magnetic force forming plate 23 that is in contact with one side of the magnet 22 and discharges magnetic force generated from the magnet 12 to the outside, and a magnetic force forming fastening member 24 for that fastens and binds the magnet 22 to the second body 21 and discharges magnetic force to the outside.

A plurality of magnets 22 are alternately arranged with N poles and S poles.

The first rotary unit 10 is composed of a first body part 11 and a magnetic force reinforcing plate 12 coupled around the outside surface of the first body part 11. A corrosion prevention plate 13 for preventing corrosion of the first body part 11 and the magnetic force reinforcing plate 12 by eddy current is further provided between the first body part 11 and the magnetic force reinforcing plate 12.

A motor 30 is connected to the power shaft (A) to input power, and a pump 40 is connected to the load shaft B to output power.

Only the attractive force between the magnet 22 and the magnetic force reinforcing plate 12 is generated so that it can be driven regardless of the change in polarity, an eddy current is generated by a polarity change, that is, a rotating magnetic field that changes with the rotation of the magnet 22, the magnetic force reinforcing plate 12 is rotated by the rotating magnetic field, it is possible without physical impact and mechanical damage at the time of sudden stop during operation or reverse rotation during forward rotation, and a non-contact type cushioning phenomenon is provided by the space between the two rotary units, thus enabling smooth reverse rotation during operation without physical impact or mechanical damage to the power shaft and load shaft.

In addition to the magnets 22 installed around the outer surface of the second body part 21 of the second rotary unit 20, deep magnets 25 are further arranged radially around the rotating shaft (load shaft).

A heat generating fan 26 formed by penetrating in an axial direction around a rotation shaft (load shaft) at the center of the second body part 21 of the second rotary unit 20 is further arranged radially.

In addition to the magnetic force reinforcing plate 12 installed around the outer surface of the first body part 11 of the first rotary unit 10, air holes 15 made of copper are further arranged radially around the rotating shaft (power shaft).

A heat generating fan 16 formed by penetrating in an axial direction around a rotation shaft (power shaft) at the center of the first body part 11 of the first rotary unit 10 is further arranged radially.

Advantageous Effects

According to the present invention as described above, the magnetic force formed between the rotary unit including the magnet arranged on the load shaft and the rotary unit of the magnetic force reinforcing plate arranged on the power shaft transmits power in a non-contact no-load state, thus being free from mechanical burnout, noise, vibration and dust, and providing stable output without periodic slip phenomenon compared to existing magnetic couplings.

In addition, the present invention enables forward rotation and reverse rotation through the magnetic coupling of the magnet-to-magnetic force reinforcing plate structure, and can control the rotation speed and output through free interval adjustment, maximizing energy efficiency.

Further, the present invention provides a variable speed power transmission clutch system which enables a plurality of load shafts to be driven corresponding to one power shaft, which is convenient to use and expands the application field.

DETAILED DESCRIPTION OF THE EMBODIMENTS

Hereinafter, an embodiment of the present invention will be described with reference to the accompanying drawings.

Figure 1:
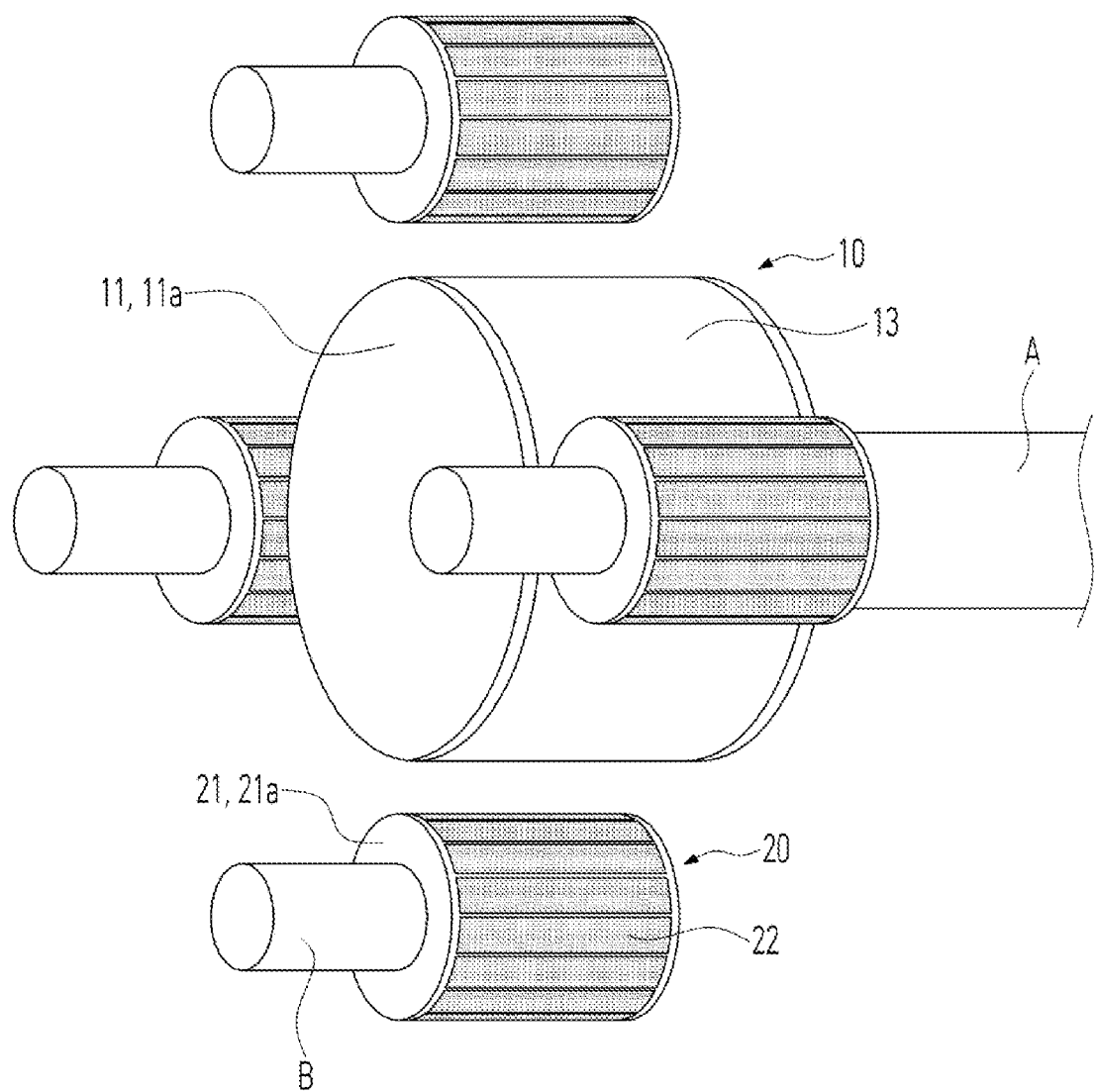
FIG. 1 is a conceptual diagram showing a variable-speed power transmission clutch system having a multiple output structure according to a first embodiment of the present invention.
Figure 2:
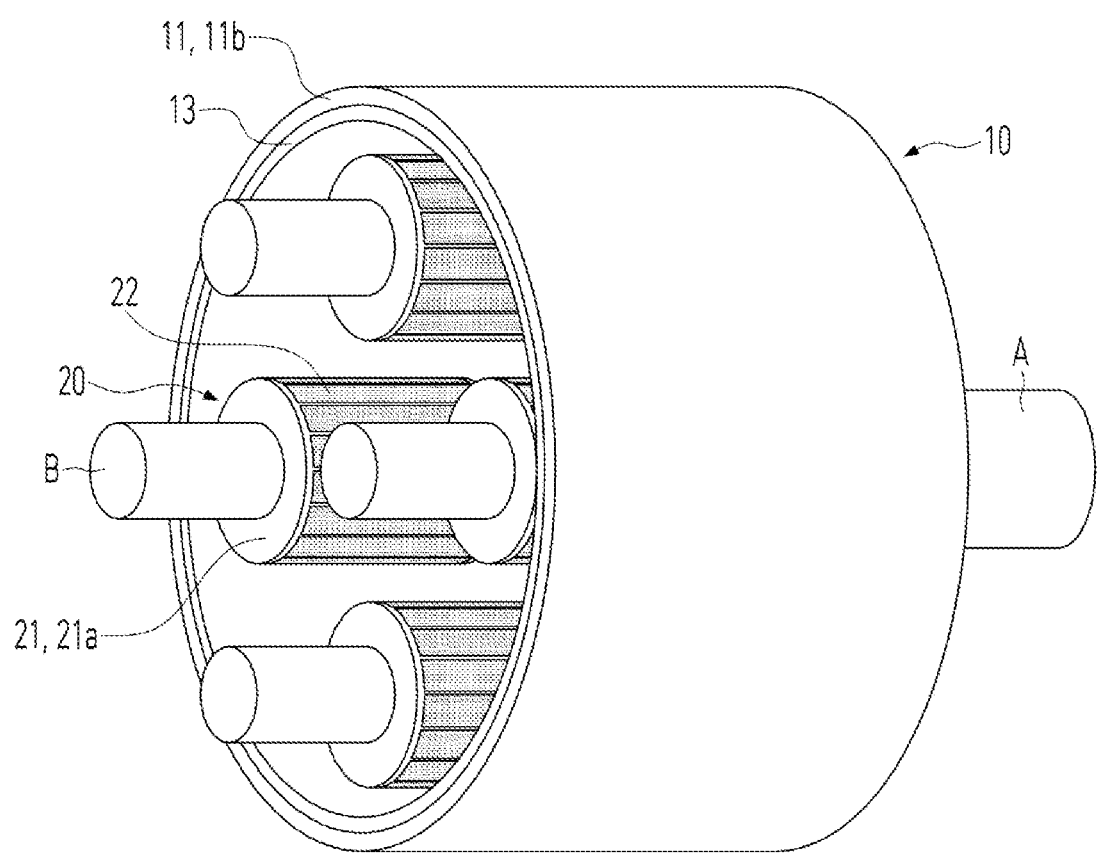
FIG. 2 is a conceptual diagram showing a variable-speed power transmission clutch system having a multiple output structure according to a second embodiment of the present invention.
Figure 3:
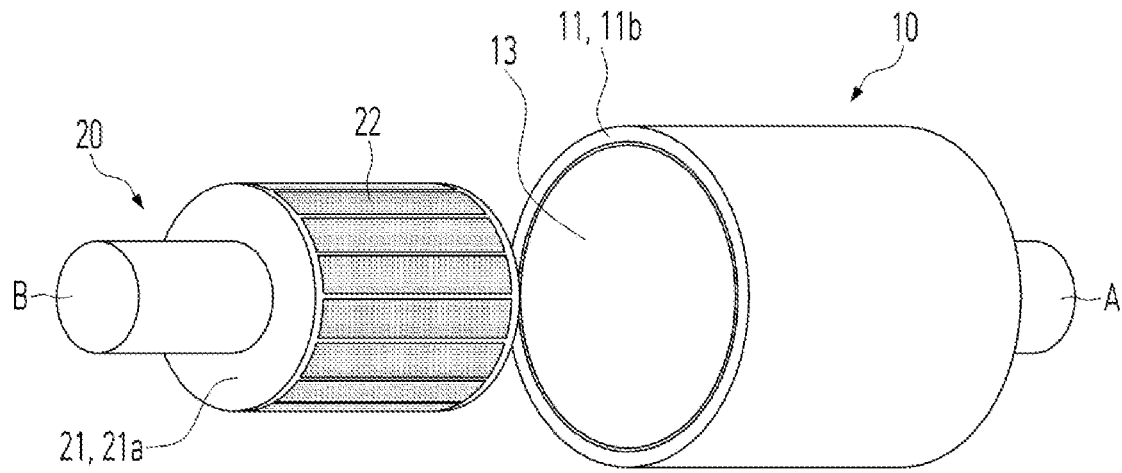
FIG. 3 is a conceptual diagram showing a variable-speed power transmission clutch system having a single output structure according to a third embodiment of the present invention.
Figure 4:
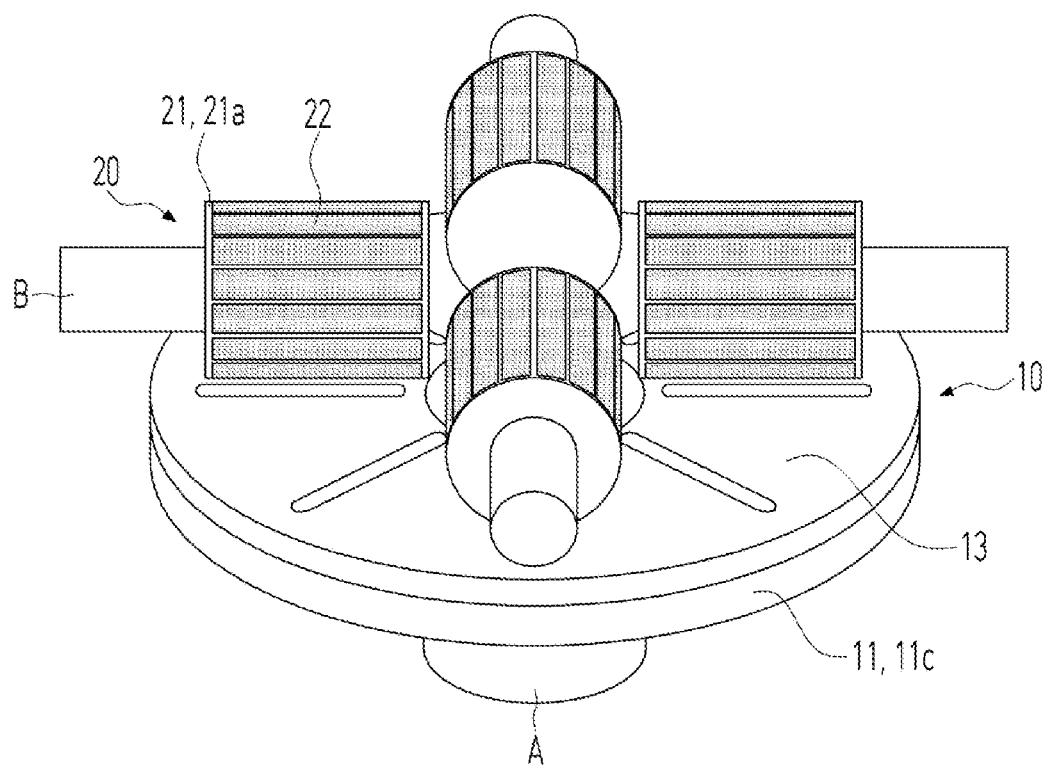
FIG. 4 is a conceptual diagram showing a variable-speed power transmission clutch system having a multiple output structure according to a fourth embodiment of the present invention.

FIG. 1 is a conceptual diagram showing a variable-speed power transmission clutch system having a multiple output structure according to a first embodiment of the present invention. FIG. 2 is a conceptual diagram showing a variable-speed power transmission clutch system having a multiple output structure according to a second embodiment of the present invention. FIG. 3 is a conceptual diagram showing a variable-speed power transmission clutch system having a single output structure according to a third embodiment of the present invention. FIG. 4 is a conceptual diagram showing a variable-speed power transmission clutch system having a multiple output structure according to a fourth embodiment of the present invention.

Referring to FIGS. 1 to 5, a variable-speed power transmission clutch system which enables a plurality of load shafts to be driven corresponding to one power shaft by an eddy current generated by magnetic force and a rotating magnetic field is disclosed.

As shown in the figures, the present invention is largely configured to include a load shaft B, a second rotary unit 20, a first rotary unit 10, and a power shaft A.

More specifically, the prevent invention comprises a plurality of load shafts B arranged on concentric circles; a plurality of second rotary units 20 for forming a cylindrical body part 21*a* at an end part of the load shafts B and forming a magnet 22 around the outer diameter circumference of the cylindrical body part 21*a*; a first rotary unit 10 installed to face the outer diameter surface of the plurality of second rotary units 20; and a power shaft A coupled to the rotation center of the first rotary unit 10 to provide a rotational force thereto, At this time, the magnet 22 is meant to include an electromagnet, and the magnetic force reinforcing plate 12 means a material as a whole having a property in which magnetic force is acted upon by a magnet.

FIGS. 1 to 3 show examples in which the axial direction of the power shaft A is parallel to the axial direction of the load shaft B.

Referring to FIG. 1, the shaft center of the power shaft A is arranged so as to pass through the inner center of the concentric circles of the plurality of load shafts (B), and the first rotary unit 10 installed at the end part of the power shaft A forms a cylindrical body part 11*a*.

The cylindrical body part 11*a* is installed so as to be located at the center of the concentric circles of the plurality of second rotary units 20. For example, a plurality of second rotary units 20 are arranged in the form of a planetary gear around the circumference of the first rotation unit 10.

At this time, the magnetic force reinforcing plate 12 is formed on the outer diameter surface of the cylindrical body part 11*a* to face the magnet 22 formed on the outer diameter surface of the second rotary unit 20.

Figure 6:
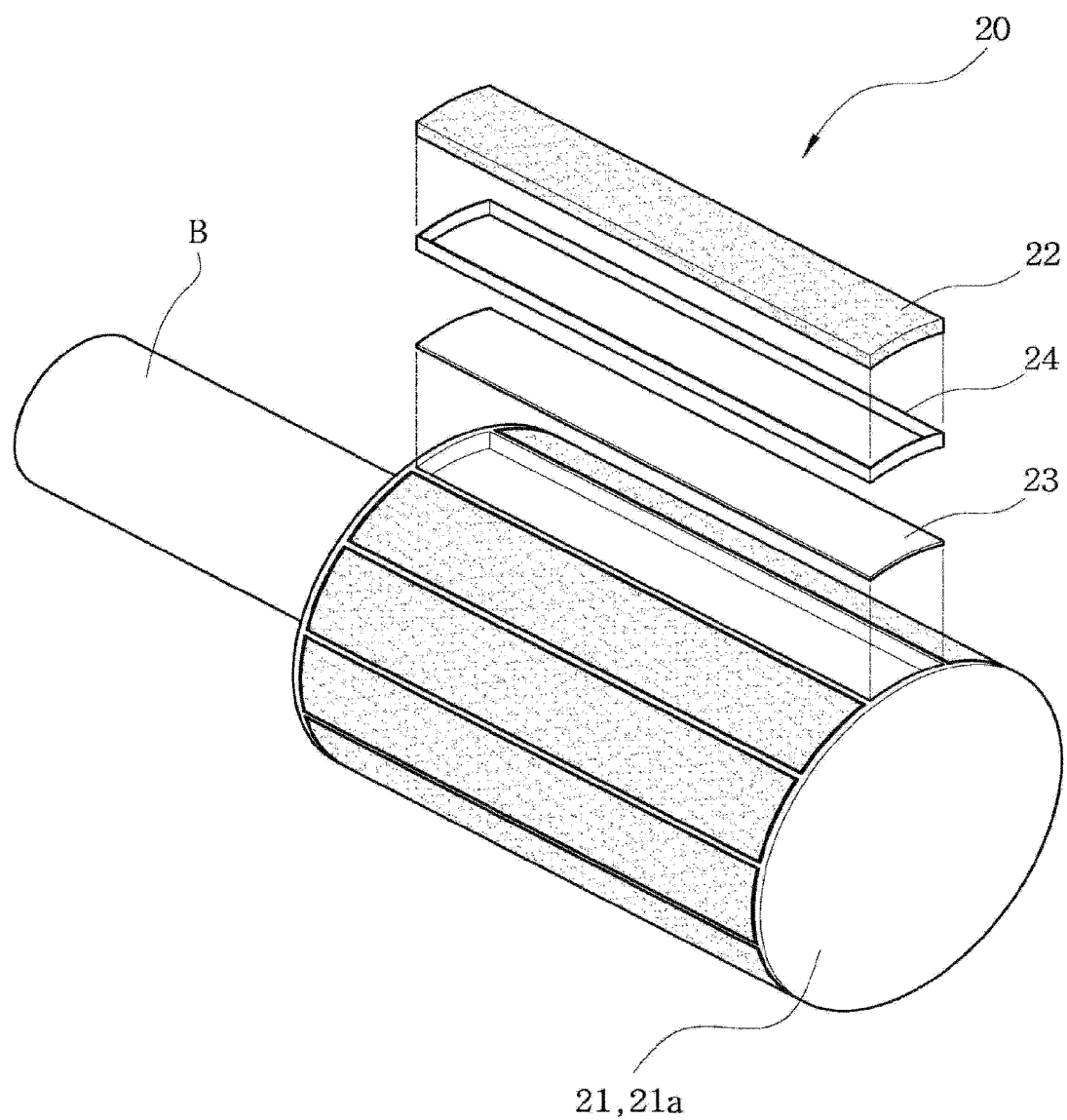
FIG. 6 is a perspective view showing a second rotary unit having a cylindrical body part according to the present invention.

FIG. 6 is a perspective view showing a second rotary unit having a cylindrical body part according to the present invention.

Referring to FIG. 6, the second rotary unit 20 forms a second body part 21, that is, a cylindrical body part 21*a*, and a plurality of magnets 22 facing the first rotary unit are arranged and coupled around the outer surface of the cylindrical body part 21*a*.

At this time, it is preferable that a plurality of magnets 22 are alternately arranged with N poles and S poles.

An insertion groove for installing magnets 22 may be formed in the periphery of the outer surface of the cylindrical body part 21*a*. In the insertion groove, a magnetic force forming plate 23 that is in contact with one side of the magnet 22 and discharging magnetic force generated from the magnet 22 to the outside and a magnetic force forming fastening member 24 that fastens and binds the magnet 22 to the second body 21 and discharges magnetic force to the outside can be inserted and installed together with the magnet 22.

At this time, the second body part 21 forms a cylindrical body part 21*a*.

Next, the first rotation unit 10 will be described.

Figure 7:
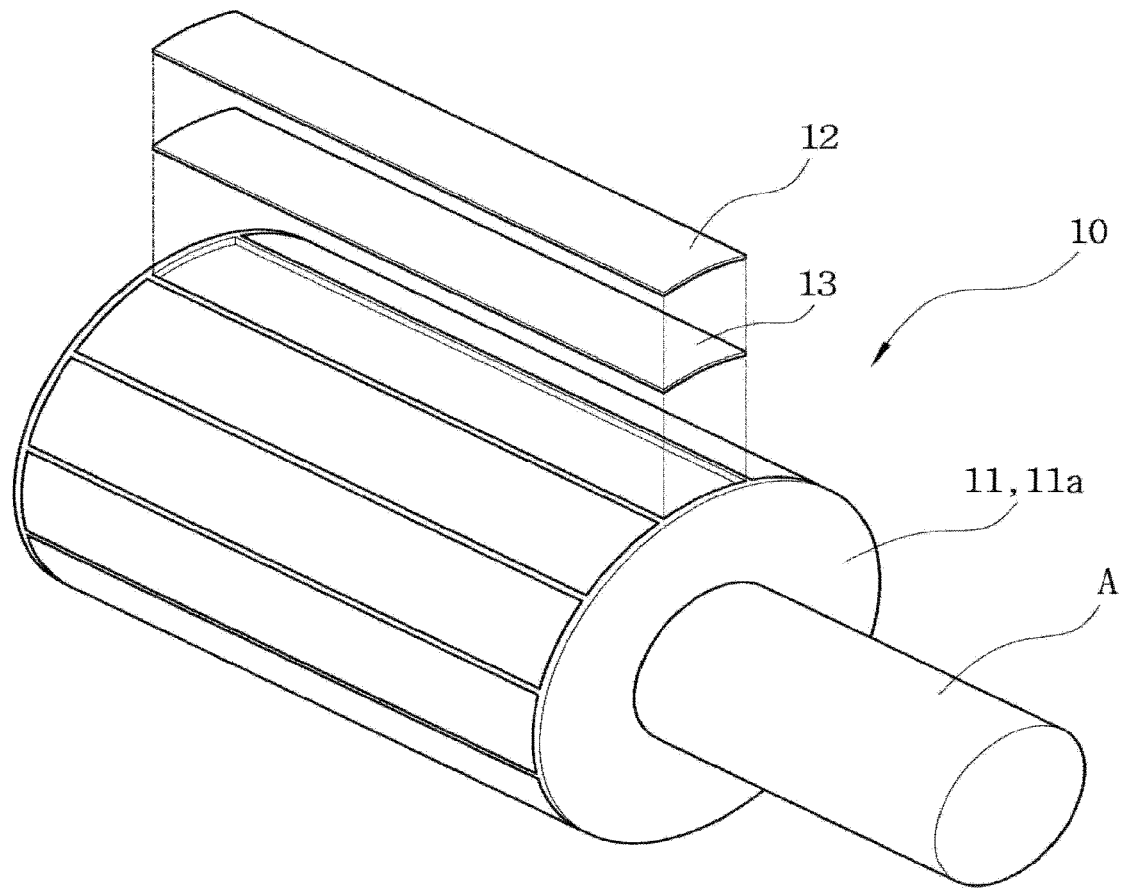
FIG. 7 is a perspective view showing a first rotary unit having a cylindrical body part according to the present invention.

FIG. 7 is a perspective view showing a first rotary unit having a cylindrical body part according to the present invention.

FIG. 7 is a perspective view showing a second rotary unit having a cylindrical body part according to the present invention. Referring to FIG. 7, the first rotary unit 10 is composed of a first body part 11, and a magnetic force reinforcing plate 12 coupled around the outside surface of the first body part 11, that is, a magnetic force reinforcing plate 12. A corrosion prevention plate 13 for preventing corrosion of the first body part 11 and the magnetic force reinforcing plate 12 by eddy current may be further provided between the first body part 11 and the magnetic force reinforcing plate 12.

Referring to FIG. 2, a first rotary unit 10 arranged so that the axis center of the power shaft (A) passes through the inner center of the concentric circles of the plurality of load shafts (B) and installed at the end part of the power shaft A is installed so as to form a drum-shaped body part 11*b* and surround the outer side of the concentric circles of the plurality of second rotary units 20.

Figure 8:
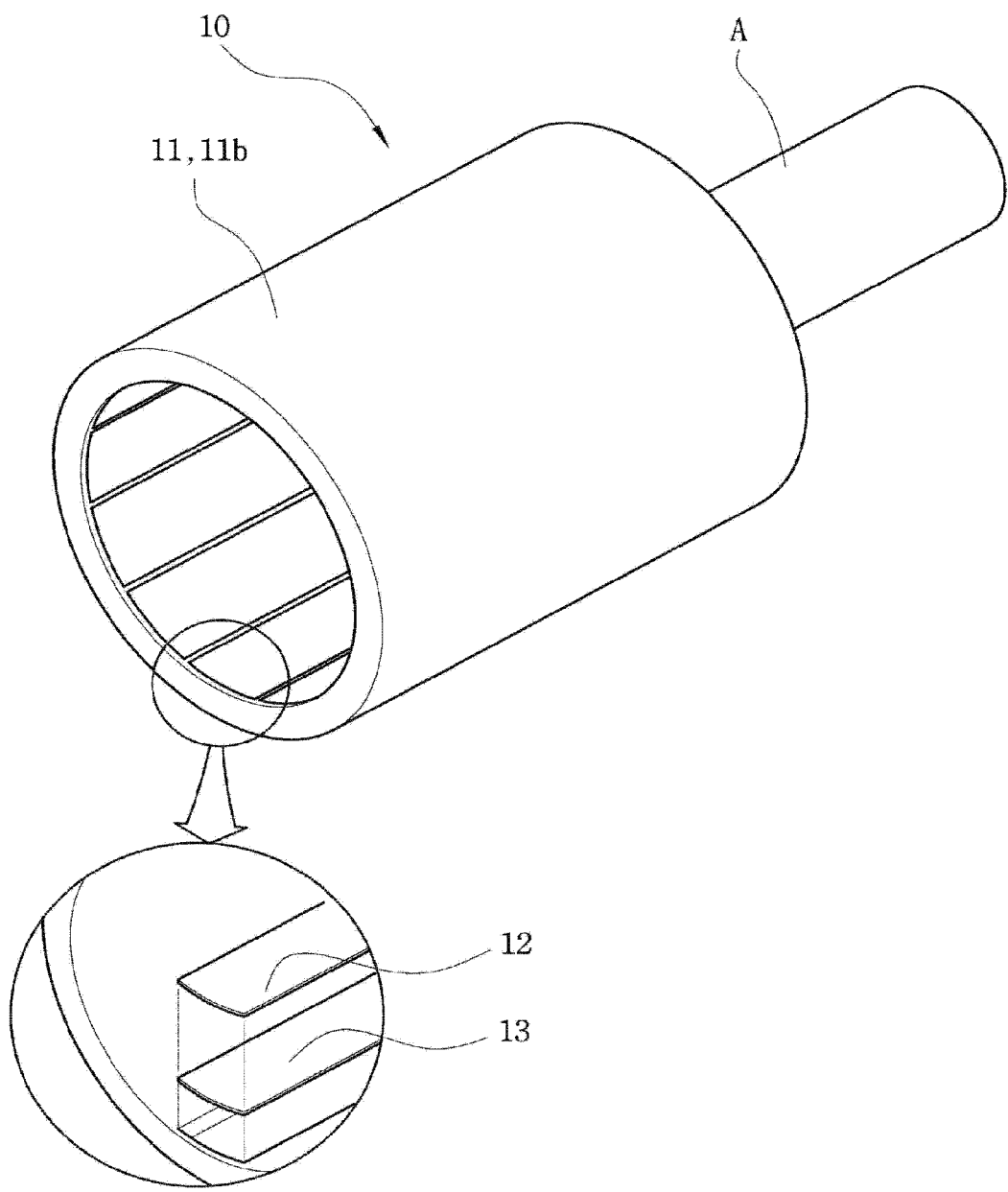
FIG. 8 is a perspective view showing a first rotary unit having a drum-shaped body part according to the present invention.

As shown in FIG. 8, the magnetic force reinforcing plate 12 is formed on the inner surface of the drum-shaped body part 11*b* so as to face the magnet 22 formed on the outer diameter surface of the second rotary unit 20.

FIG. 8 is a perspective view showing a first rotary unit having a drum-shaped body part according to the present invention. Referring to FIG. 8, the first rotary unit 10 forms a first body part 11, that is, a drum-shaped body part 11*b*, and a magnetic force reinforcing plate 12 facing the magnet 22 of the second rotary unit 20 is arranged and coupled around the inner surface of the drum-shaped body part 11*b*.

At this time, the first body part 11 forms a drum-shaped body part 11b, and a corrosion prevention plate 13 for preventing corrosion of the first body part 11 and the magnetic force reinforcing plate 12 by eddy current can be further provided between the drum-shaped body part 11b and the magnetic force reinforcing plate 12.

Referring to FIG. 4, there can be provided a variable-speed power transmission clutch system having multiple output structure, wherein the axial direction of the power shaft A is arranged to form a right angle with respect to the axial direction of the load shaft B.

At this time, a plurality of load shafts B are arranged radially with respect to the axis center of the power shaft A, the first rotary unit 10 installed at the end part of the power shaft A forms a disc-shaped body part 11c, and a magnetic force reinforcing plate 12 is formed on the disc-shaped body part 11c so as to face the magnet 22 formed on the outer diameter surface of the second rotary unit 20.

Next, the first rotary unit constituting the disc-shaped body part 11c will be described with reference to FIG. 9.

Figure 9:
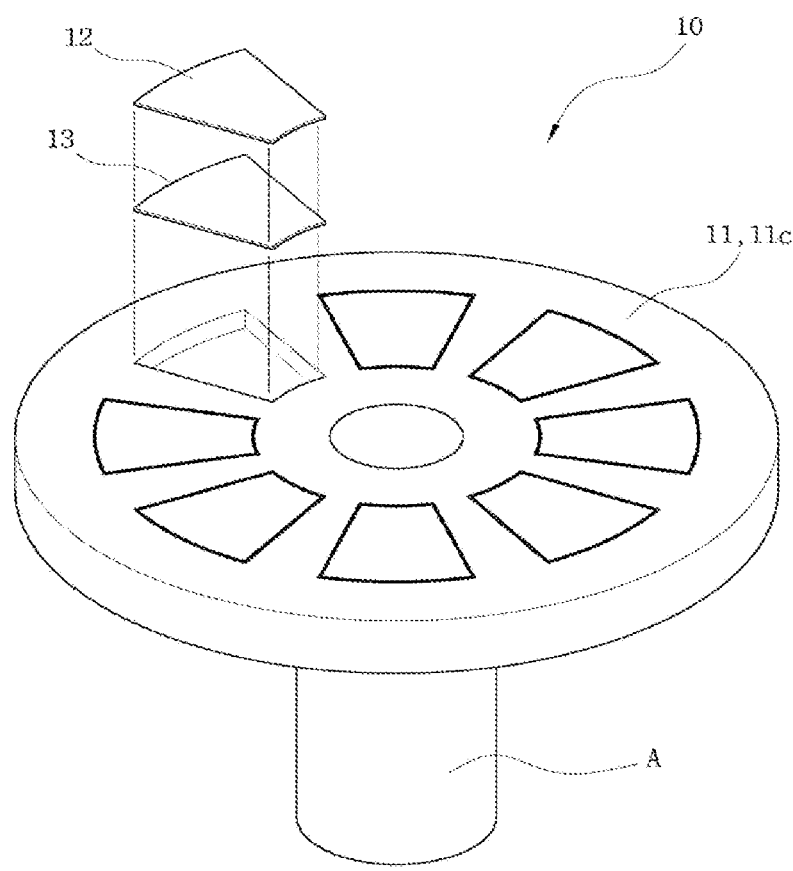
FIG. 9 is a perspective view showing a first rotary unit having a disc-shaped body part according to the present invention.

FIG. 9 is a perspective view showing a first rotary unit having a disc-shaped body part according to the present invention. The first rotary unit 10 forms a first body part 11, that is, a disk-shaped body part 11c, and a plurality of magnetic force reinforcing plates 12 facing the magnets 22 of the second rotary unit 20 are coupled around the inner surface of the disc-shaped body part 11c.

At this time, an insertion groove for installing the magnetic force reinforcing plate 12 may be formed on the front surface of the disc-shaped body part 11c.

Further, a corrosion prevention plate 13 for preventing corrosion of the first body part 11 and the magnetic force reinforcing plate 12 by eddy current may be further provided between the disk-shaped body part 11c and the magnetic force reinforcing plate 12.

As described above, the present invention allows the positions of the first rotary unit 10 and the second rotary unit 20 so as to be spaced apart or close to each other, so that the amount of load applied to the coupling can be controlled.

Figure 5:
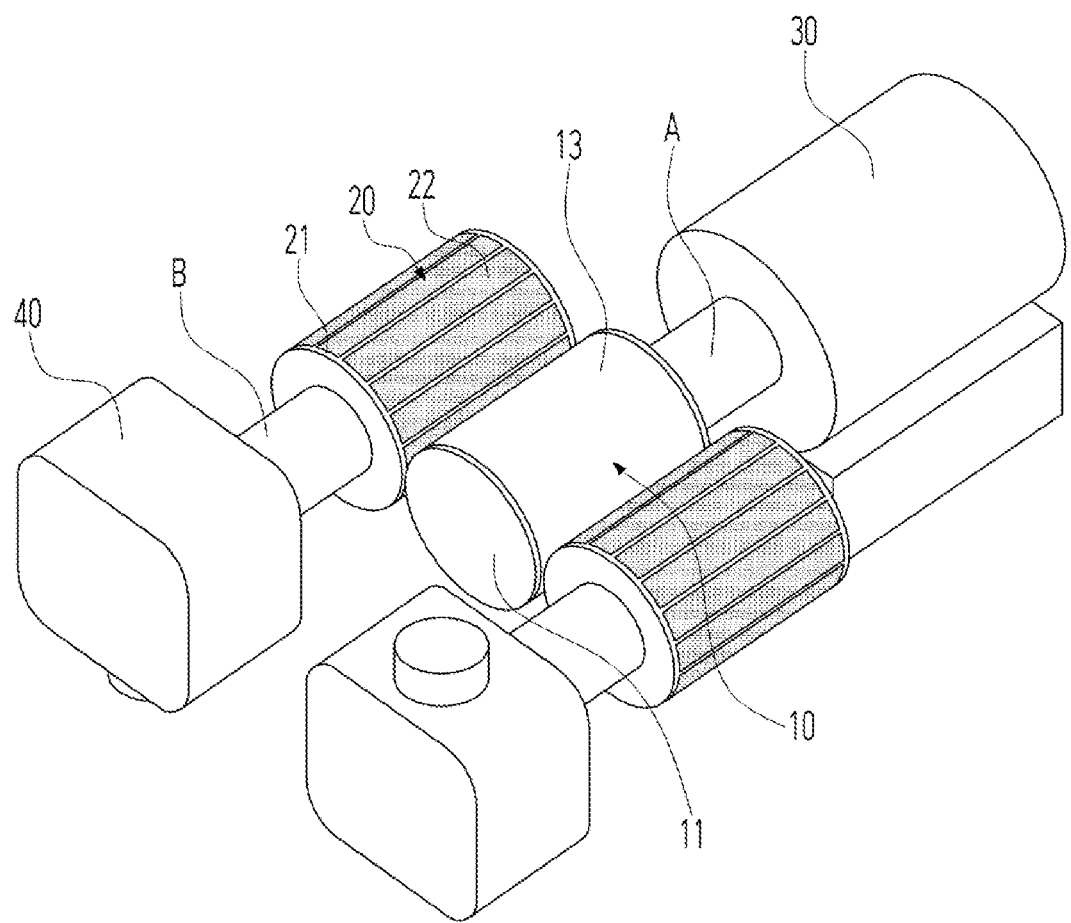
FIG. 5 is a conceptual diagram showing a variable-speed power transmission clutch system having a multiple output structure according to a fifth embodiment of the present invention.

FIG. 5 is a conceptual diagram showing a variable-speed power transmission clutch system having a multiple output structure according to a fifth embodiment of the present invention.

Referring to FIG. 5, a variable-speed power transmission clutch system having multiple output structure wherein a motor 30 is connected to the power shaft A to input power, and a pump 40 or the like is connected to the load shaft B to output power is disclosed.

The variable-speed power transmission clutch system having multiple output structure according to the present invention provides a variable-speed power transmission clutch system which enables a plurality of load shafts to be driven corresponding to one power shaft, which is convenient to use and expands the application field.

Further, according to the present invention, only the attractive force between the magnet 22 and the magnetic force reinforcing plate 12 is generated so that it can be driven regardless of the change in polarity, an eddy current is generated by a polarity change, that is, a rotating magnetic field that changes with the rotation of the magnet 22, the magnetic force reinforcing plate 12 is rotated by the rotating magnetic field, it is possible without physical impact and mechanical damage at the time of sudden stop during operation or reverse rotation during forward rotation, and a non-contact type cushioning phenomenon is provided by the space between the two rotary units, thus enabling smooth reverse rotation during operation without physical impact or mechanical damage to the power shaft and load shaft.

Figure 10:
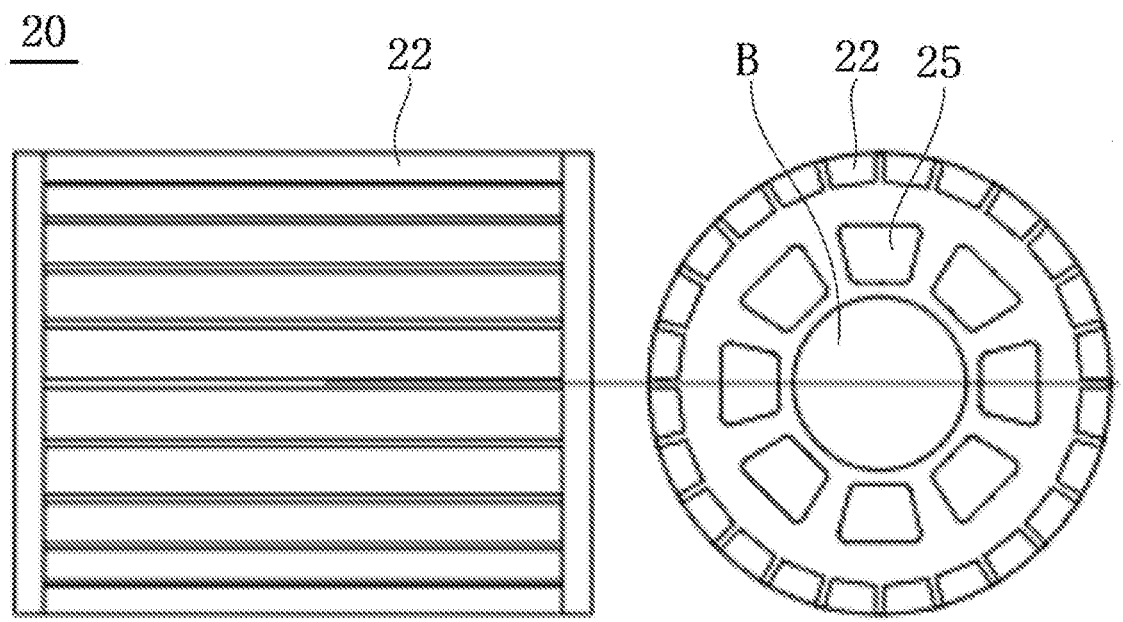
FIGS. 10 and 11 are side cross-sectional views showing a modified embodiment of the second rotary unit according to the present invention.
Figure 11:
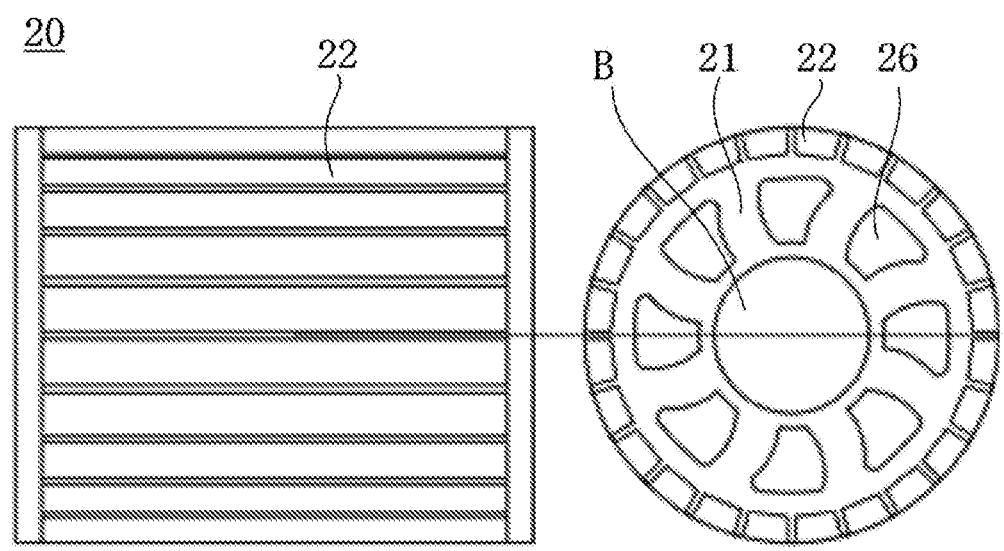

FIGS. 10 and 11 are side cross-sectional views showing a modified embodiment of the second rotary unit according to the present invention. FIG. 10 shows an example in which in addition to a magnet 22 installed around the outer surface of the second body part 21 of the second rotary unit 20, a deep magnet 25 is further arranged radially around a rotating shaft (load shaft), and FIG. 11 shows an example in which a heat generating fan 26 formed by penetrating in the axial direction around the rotating shaft (load shaft) is further arranged radially.

Figure 12:
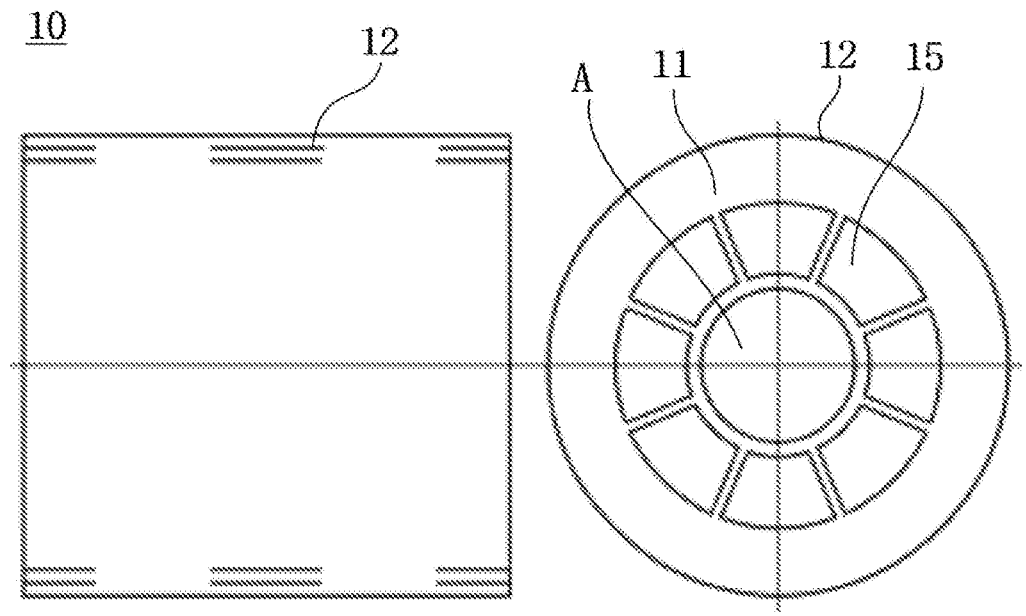
FIGS. 12 and 13 are side cross-sectional views showing a modified embodiment of the first rotation unit according to the present invention.
Figure 13:
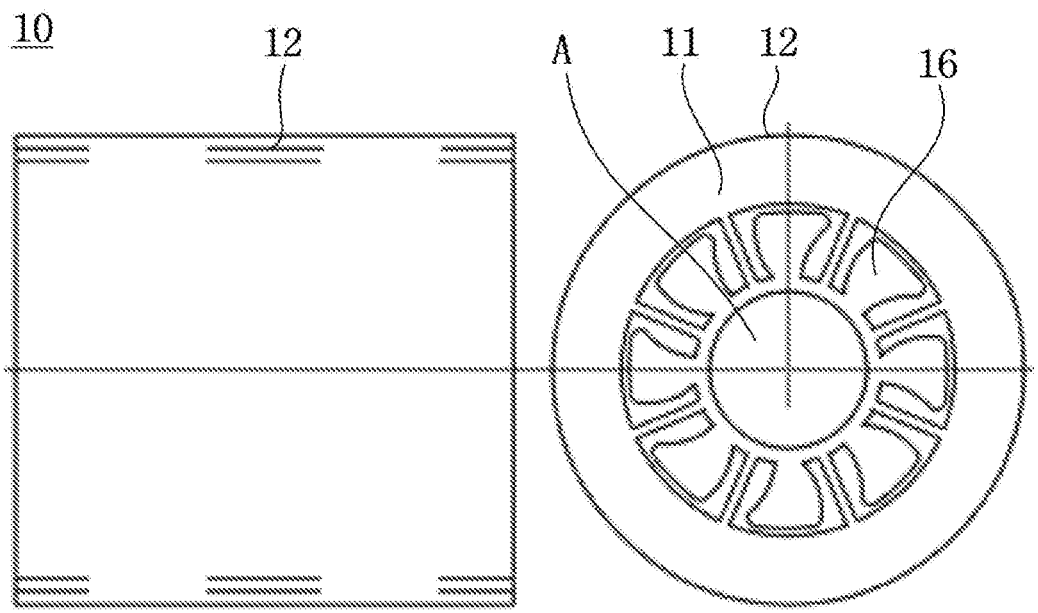

FIGS. 12 and 13 are side cross-sectional views showing a modified embodiment of the first rotation unit according to the present invention. FIG. 12 shows an example in which in addition to the magnetic force reinforcing plate 12 installed around the outer surface of the first body part 11 of the first rotation unit 10, air holes 15 made of copper are further arranged radially around the rotating shaft (power shaft), and FIG. 13 shows an example in which a heat generating fan 16 formed by penetrating in the axial direction around the rotating shaft (power shaft) is further arranged radially.

Figure 14:
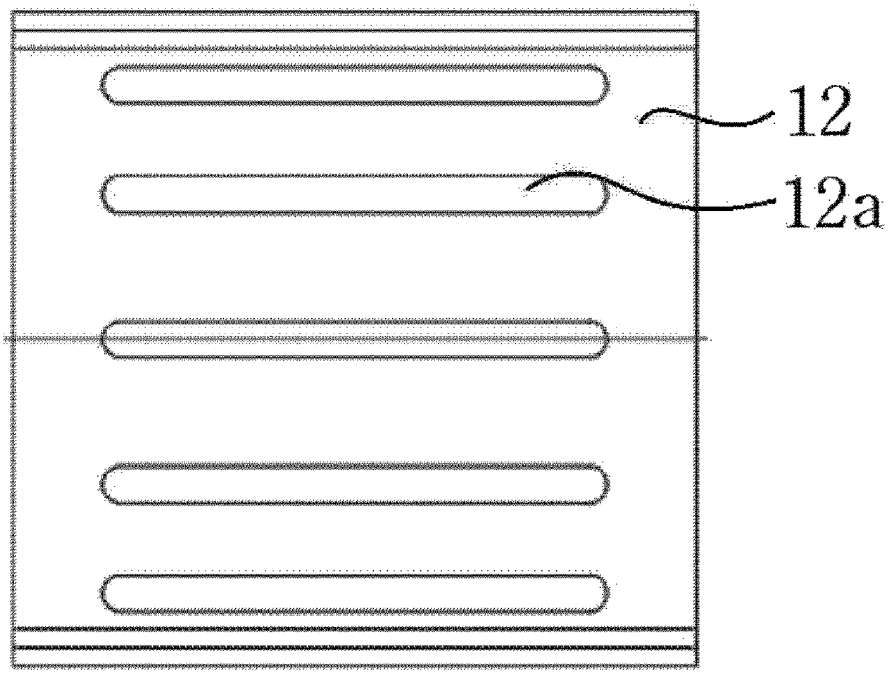
FIGS. 14 to 16 are schematic diagrams showing a modified embodiment of the magnetic force reinforcing plate according to the present invention.
Figure 15:
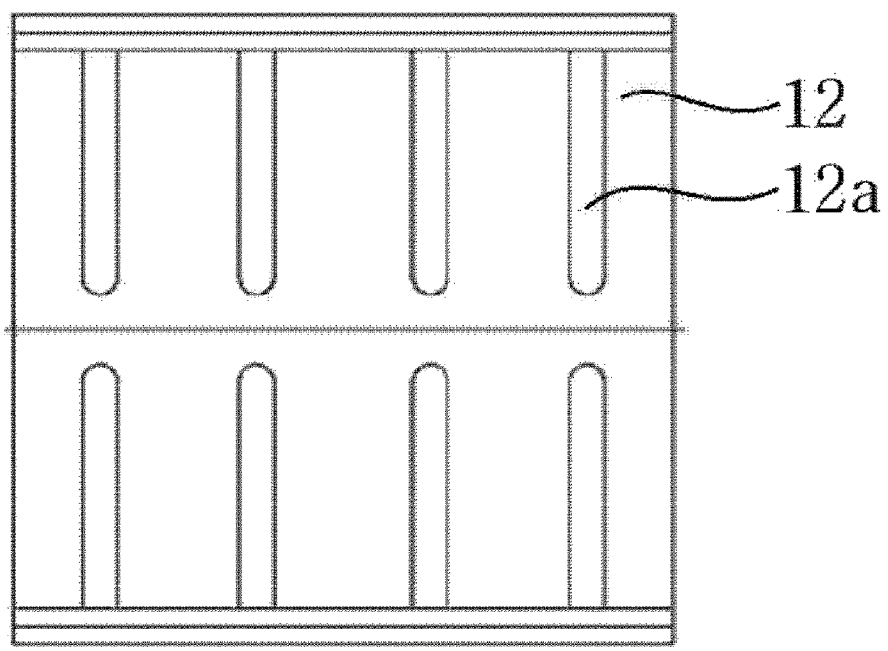
Figure 16:
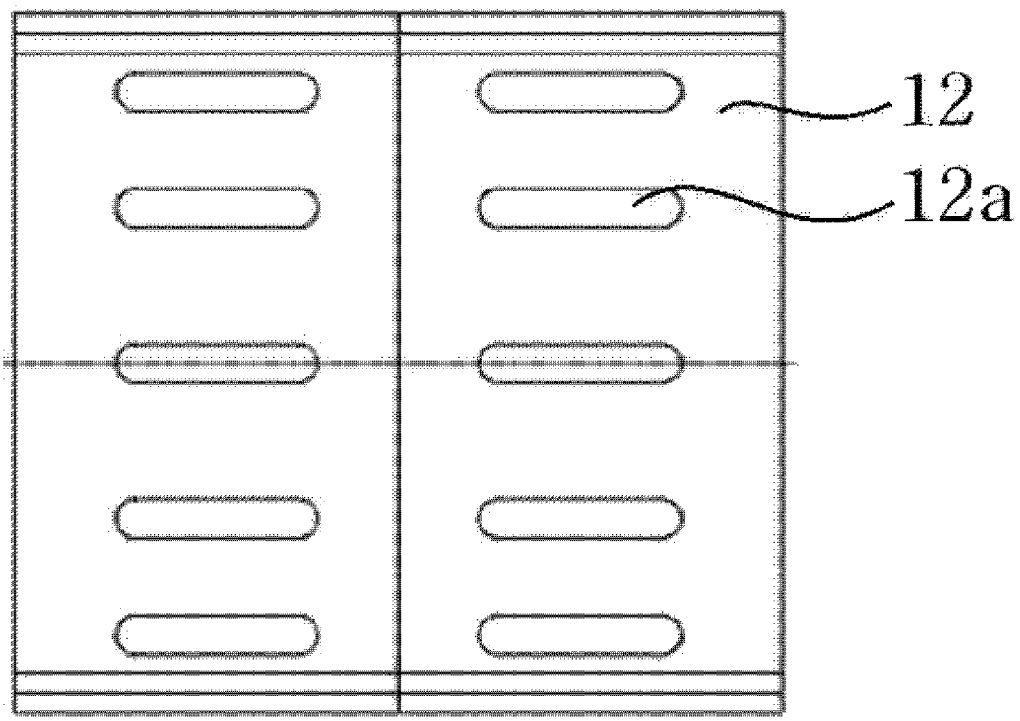

FIGS. 14 to 16 are schematic diagrams showing a modified embodiment of the magnetic force reinforcing plate according to the present invention.

The magnetic force reinforcing plate 12 formed in the first rotary unit 10 of the present invention may form various types of heat dissipation patterns 12a as shown in FIGS. 14 to 16.

FIGS. 14 and 16 show a heat dissipation pattern 12a of a transverse pattern parallel to the axial direction, and FIG. 15 shows an example of forming the heat dissipation pattern 12a of a longitudinal pattern orthogonal to the axial direction.

According to the present invention as described above, the magnetic force formed between the rotary unit including the magnet arranged on the load shaft and the rotary unit of the magnetic force reinforcing plate 12 arranged on the power shaft transmits power in a non-contact no-load state, thus being free from mechanical burnout, noise, vibration and dust, and providing stable output without periodic slip phenomenon compared to existing magnetic couplings.

In addition, the present invention enables forward rotation and reverse rotation through the magnetic coupling of the magnet-to-magnetic force reinforcing plate structure, and can control the rotation speed and output through free interval adjustment, maximizing energy efficiency.

The motor pump of the present invention as described above can be replaced with a power unit such as an engine. In addition, the shape and number of the first rotary unit and the second rotary unit are not limited and can be variously modified.

As described above, the present invention is not limited to the specific preferred embodiments described above, and those of ordinary skill in the art can make various modifications without departing from the scope of the present invention defined in the appended claims, and such modifications falls within the scope of the claims.

The invention claimed is:

1. A variable-speed power transmission clutch system having a multiple-output structure, wherein the variable-speed power transmission clutch system enables a plurality of load shafts to be driven by a power shaft through an eddy current generated by magnetic force and a rotating magnetic field, and comprises:

a plurality of second rotary units for forming a cylindrical body part at an end part of the load shafts and forming a magnet around the outer diameter circumference of the cylindrical body part;

a first rotary unit installed to face the outer diameter surface of the plurality of second rotary units; and the power shaft coupled to the rotation center of the first rotary unit to provide a rotational force thereto, wherein axial directions of the load shafts and the power shaft are arranged so that they are parallel to each other, wherein the first rotary unit installed at the end part of the power shaft forms a drum-shaped body part and is installed to surround the outside of the concentric circles of single or plurality of second rotary units, and wherein a magnetic force reinforcing plate is formed on the inner surface of the drum-shaped body part to radially face the magnet formed on the outer diameter surface of the second rotary unit and respond with magnetic force, wherein the first rotary unit and the second rotary unit are configured such that a radial spacing between the magnetic force reinforcing plate and the magnet is selectively varied to thereby adjust the amount of load applied to the load shafts.

2. The variable-speed power transmission clutch system having a multiple-output structure, wherein the variable-speed power transmission clutch system enables a plurality of load shafts to be driven by a power shaft through an eddy current generated by magnetic force and a rotating magnetic field, and comprises:

a plurality of second rotary units for forming a cylindrical body part at an end part of the load shafts and forming a magnet around the outer diameter circumference of the cylindrical body part;

a first rotary unit installed to face the outer diameter surface of the plurality of second rotary units; and the power shaft coupled to the rotation center of the first rotary unit to provide a rotational force thereto, wherein axes of the load shafts are oriented at right angles to an axis of the power shaft, wherein one or more load shafts are radially arranged with respect to the axis center of the power shaft, wherein the first rotary unit installed at the end part of the power shaft forms a disc-shaped body part, and wherein a magnetic force reinforcing plate is formed on the disc-shaped body part to face the magnet formed on the outer diameter surface of the second rotary unit and respond with magnetic force, wherein the first rotary unit and the second rotary unit are configured such that a spacing between the magnetic force reinforcing plate and the magnet is selectively varied to thereby adjust the amount of load applied to the load shafts.

3. The variable-speed power transmission clutch system having multiple output structure according to claim 1, wherein the second rotary unit comprises a second body part, the magnet arranged and coupled around the opposite surface of the second body part to the first rotary unit, a magnetic force forming plate that is in contact with one side of the magnet, and a magnetic force forming fastening member that fastens and binds the magnet to the second body.

4. The variable-speed power transmission clutch system having multiple output structure according to claim 2, wherein the second rotary unit comprises a second body part, the magnet arranged and coupled around the opposite surface of the second body part to the first rotary unit, a magnetic force forming plate that is in contact with one side of the magnet, and a magnetic force forming fastening member that fastens and binds the magnet to the second body.

5. The variable-speed power transmission clutch system having multiple output structure according to claim 1, wherein a plurality of magnets are alternately arranged with N poles and S poles.

6. The variable-speed power transmission clutch system having multiple output structure according to claim 2, wherein a plurality of magnets are alternately arranged with N poles and S poles.

7. The variable-speed power transmission clutch system having multiple output structure according to claim 1, wherein a motor is connected to the power shaft A to input power, and a pump is connected to each of the load shafts to output power.

8. The variable-speed power transmission clutch system having multiple output structure according to claim 2, wherein a motor is connected to the power shaft to input power, and a pump is connected to each of the load shafts to output power.

* * * * *